United States Patent
Liu et al.

(10) Patent No.: US 9,311,644 B2
(45) Date of Patent: Apr. 12, 2016

(54) ITEM LISTING CATEGORIZATION SYSTEM

(71) Applicant: eBay Inc., San Jose, CA (US)

(72) Inventors: Ming Liu, Palo Alto, CA (US); Suresh Raman, Santa Clara, CA (US); Rui Li, San Jose, CA (US)

(73) Assignee: eBay Inc., San Jose, CA (US)

(*) Notice: Subject to any disclaimer, the term of this patent is extended or adjusted under 35 U.S.C. 154(b) by 179 days.

(21) Appl. No.: 13/966,160

(22) Filed: Aug. 13, 2013

(65) Prior Publication Data
US 2015/0052143 A1   Feb. 19, 2015

(51) Int. Cl.
*G06F 17/30*   (2006.01)
*G06Q 30/00*   (2012.01)

(52) U.S. Cl.
CPC .......... *G06Q 30/00* (2013.01); *G06F 17/30705* (2013.01)

(58) Field of Classification Search
CPC ................................................ G06F 17/30598
See application file for complete search history.

(56) References Cited

U.S. PATENT DOCUMENTS

| | | | | |
|---|---|---|---|---|
| 8,521,613 B2* | 8/2013 | Erbey et al. | | 705/26.81 |
| 2009/0210315 A1* | 8/2009 | Jean et al. | | 705/26 |
| 2010/0082572 A1* | 4/2010 | Arora et al. | | 707/706 |
| 2011/0184806 A1* | 7/2011 | Chen et al. | | 705/14.52 |
| 2012/0123863 A1* | 5/2012 | Kaul et al. | | 705/14.52 |
| 2012/0317120 A1* | 12/2012 | Zhong et al. | | 707/740 |

OTHER PUBLICATIONS

"E-Commerce Product Categorization", Srinivasu Gottipati et al., Dec. 14, 2012.*

* cited by examiner

*Primary Examiner* — Apu Mofiz
*Assistant Examiner* — Cindy Nguyen
(74) *Attorney, Agent, or Firm* — Schwegman Lundberg & Woessner, P.A.

(57) ABSTRACT

Techniques for categorizing item listings based on parsing item listing titles are described. According to various embodiments, listing titles of one or more item listings on a marketplace website are accessed, the item listings being associated with a particular product category in a product category structure of the marketplace website. Words in each of the listing titles may then be converted to semantic tokens in a token symbol space, based on a tokenization process. Thereafter, n-gram modeling may be performed on the tokens corresponding to each of the listing titles of the item listings in the particular product category. One or more dominant n-gram models associated with the listing titles of the item listings in the particular product category may then be identified.

18 Claims, 10 Drawing Sheets

| PRODUCT CATEGORY | ITEM LISTINGS |
|---|---|
| Accessories | Listing 1<br>Listing 2<br>Listing 3<br>Listing 4<br>Listing 5<br>Listing 6<br>Listing 7<br>… |
| Computers | Listing 11<br>Listing 12<br>Listing 13<br>Listing 14<br>Listing 15<br>Listing 16<br>… |
| … | … |

*Fig. 4*

| PRODUCT CATEGORY | ATTRIBUTES |
|---|---|
| Accessories | Brand<br>Model<br>Size<br>Material<br>Type<br>Brand<br>Color<br>... |
| Computer | CPU<br>Memory<br>Hard Disk Space<br>Display Size<br>Wi-fi capability<br>Graphics Processor<br>... |
| ... | ... |

*Fig. 6*

| PRODUCT CATEGORY | DOMINANT N-GRAM MODEL(S) |
| --- | --- |
| Accessories | A+4+P<br>P+A<br>Model 1<br>Model 1<br>Model 2<br>Model 3<br>Model 4<br>… |
| Computer | Model 11<br>Model 12<br>Model 13<br>Model 14<br>Model 15<br>… |
| … | … |

*Fig. 7*

ITEM LISTING CATEGORIZATION SYSTEM

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2013, All Rights Reserved.

TECHNICAL FIELD

The present application relates generally to data processing systems and, in one specific example, to techniques for categorizing item listings based on parsing item listing titles.

BACKGROUND

Conventional e-commerce websites allow shoppers to browse through a wide variety of items available for sale online. Each e-commerce website generally maintains its own product category structure that defines various product categories, and various items from the various product categories may be posted for sale on the website.

BRIEF DESCRIPTION OF THE DRAWINGS

Some embodiments are illustrated by way of example and not limitation in the figures of the accompanying drawings in which:

FIG. 4 illustrates an example of item listing information identifying item listings associated with different product categories, according to various embodiments;

FIG. 6 illustrates an example of attribute information identifying various attributes associated with different product categories, according to various embodiments;

FIG. 7 illustrates an example of dominant n-gram model information identifying various dominant n-gram models associated with different product categories, according to various embodiments;

DETAILED DESCRIPTION

Figure 1:
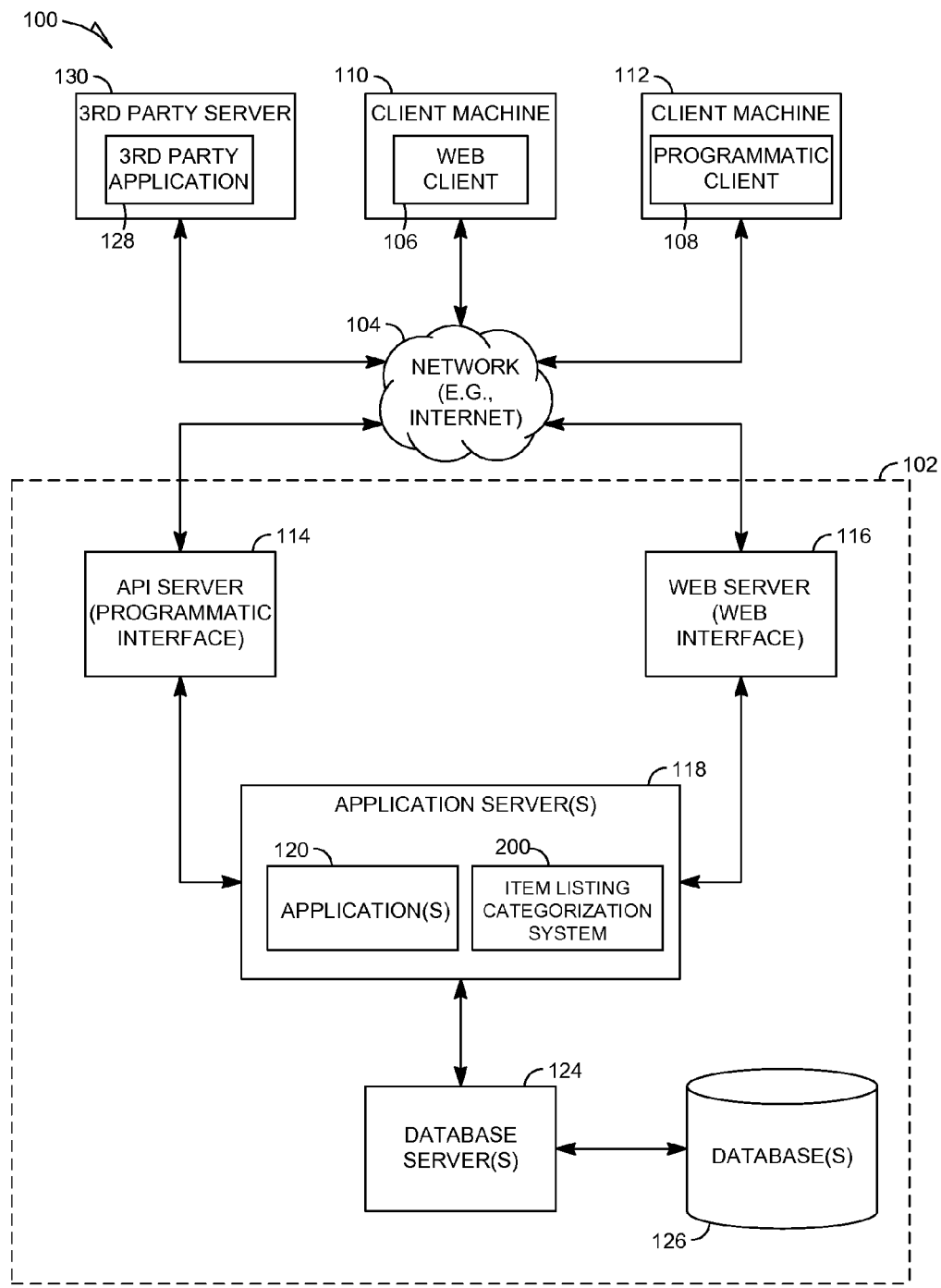
FIG. 1 is a network diagram depicting a client-server system, within which one example embodiment may be deployed.

Example methods and systems for categorizing item listings based on parsing item listing titles are described. In the following description, for purposes of explanation, numerous specific details are set forth in order to provide a thorough understanding of example embodiments. It will be evident, however, to one skilled in the art that the present invention may be practiced without these specific details.

According to various exemplary embodiments, a system parses item listing titles based on token symbolization and performs n-gram modeling of the parsed listing titles, in order to determine the dominant n-gram models for listing titles in various product categories. For example, the system may include a rule-based engine that may convert the title from the text domain to the semantic token domain, by converting words in the listing title to abstract semantic tokens in a token symbol space (e.g., a product token, an accessory token, a product description token, a "with" token, an unknown token, etc.). The system may then use n-gram background modeling and machine learning on the abstract semantic tokens in the token symbol space, in order to generate various n-gram models for the listing titles in various categories.

For example, the listing title "Leather Case for Samsong Galaxy" associated with the accessory product category includes an accessory token "A" (e.g., the words "leather case"), followed by a token "4" (e.g., the word "for"), followed by a product token "P" (e.g., "Samsong"), followed by a product token" "P" (e.g., "galaxy"), which may correspond to an A+4+P n-gram model. Accordingly, by performing n-gram modeling on a large number of listing titles associated with the accessory product category, the system may determine that, for example, the A+4+P n-gram model is a dominant n-gram model for accessory item listings. As another example, the system may determine that the P+A n-gram model (e.g., "iPhone case") is another dominant n-gram model for accessory product listings. These techniques can be applied by the system to item listings associated with other product types or product categories, such as n-gram models for "bundles" (e.g., "Canun 600D with lens" corresponds to a P token+P token+"w" (with) token+A token, or a P+w+A n-gram model).

In some embodiments, after the system uses machine learning to learn the dominant n-gram models for various product categories, the system may automatically categorize item listings by parsing the listing titles and determining if the listing titles are associated with the dominant n-gram model for a particular product category. For example, a potential problem with item listings is that sellers may place items into the incorrect categories (e.g., by placing an iPhone case in the "smartphone" category rather than the "smartphone accessory category"), either due to error or due to deceptive intent to cause buyers searching for iPhones to be presented with the seller's item listing. This frustrates the search experience by making it more difficult for buyers to find the listings they are really interested in.

Accordingly, the system can compare listing titles with dominant n-gram models for various product categories, in order to detect the correct product category for the listing title. Thus, system can detect if, for example, the item listing has been attached to the incorrect category by the seller, and can suggest the correct product category associated with the item listing. Accordingly, the system can enhance the selling experience by assisting sellers in finding the correct product category for the items they wish to sell. Similarly, the system can enhance the search experience by ensuring that buyers are able to find the listings they are really interested in. In some embodiments, the system can assign item listings to product categories even when unknown tokens are present. For example, the system can determine that a listing title with token symbolization ?+4+P (where "?" represents an unknown token) likely corresponds to the A+4+P dominant n-gram model associated with accessory listings.

FIG. 1 is a network diagram depicting a client-server system 100, within which one example embodiment may be deployed. A networked system 102 provides server-side functionality via a network 104 (e.g., the Internet or Wide Area Network (WAN)) to one or more clients. FIG. 1 illustrates, for example, a web client 106 (e.g., a browser), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more databases servers 124 that facilitate access to one or more databases 126. According to various exemplary embodiments, the applications 120 may be implemented on or executed by one or more of the modules of the item listing categorization system 200 illustrated in FIG. 2. While the applications 120 are shown in FIG. 1 to form part of the networked system 102, it will be appreciated that, in alternative embodiments, the applications 120 may form part of a service that is separate and distinct from the networked system 102. With some embodiments, the application servers 118 hosts what is referred to herein as an item listing categorization system 200. The item listing categorization system 200 is described in more detail below in conjunction with FIG. 2.

Further, while the system 100 shown in FIG. 1 employs a client-server architecture, the present invention is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

Figure 2:
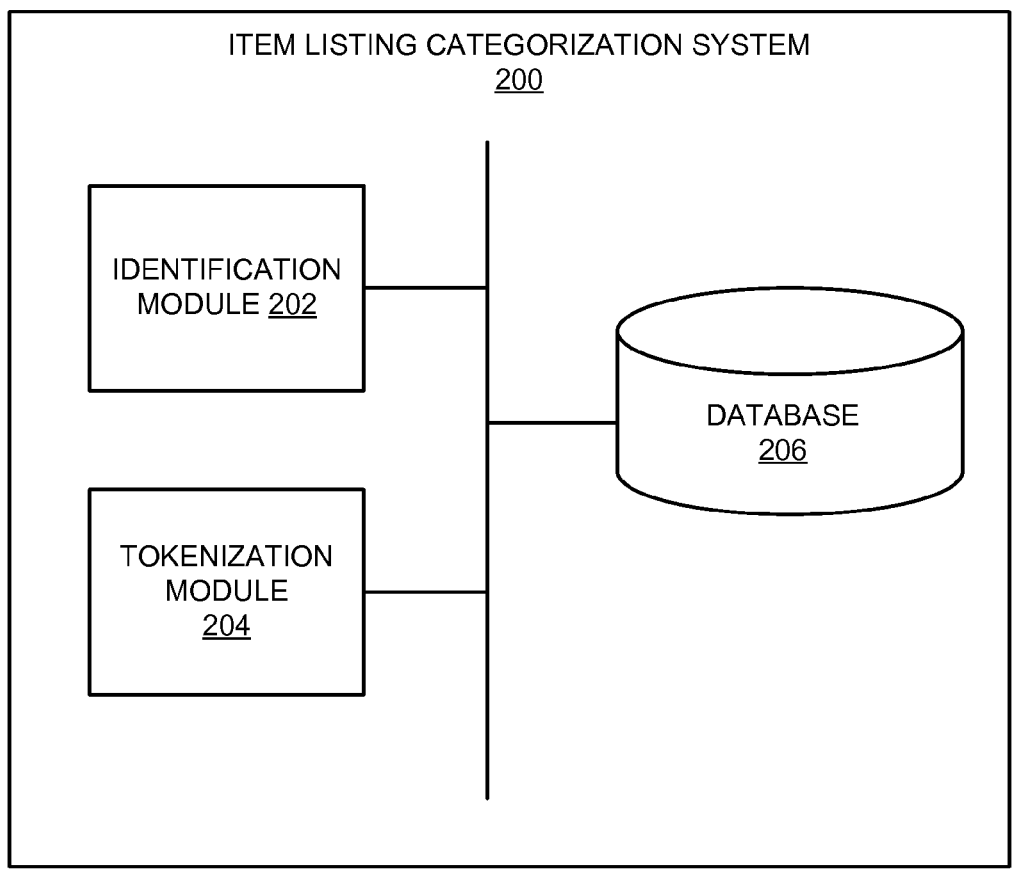
FIG. 2 is a block diagram of an example system, according to various embodiments.

Turning now to FIG. 2, an item listing categorization system 200 includes an identification module 202, a tokenization module 204, and a database 206. The modules of the item listing categorization system 200 may be implemented on or executed by a single device such as an item listing categorization device, or on separate devices interconnected via a network. The aforementioned item listing categorization device may be, for example, one of the client machines (e.g. 110, 112) or application server(s) 118 illustrated in FIG. 1.

According to various exemplary embodiments described in more detail below, the identification module 202 is configured to access listing titles of item listings on a marketplace website, the item listings being associated with a particular product category in a product category structure of the marketplace website. The tokenization module 204 is then configured to convert words in each of the listing titles to semantic tokens in a token symbol space, based on a tokenization process. Thereafter, the tokenization module 204 may perform n-gram modeling on the tokens corresponding to each of the listing titles of the item listings in the particular product category. The tokenization module 204 may then identify one or more dominant n-gram models associated with the listing titles of the item listings in the particular product category. The operation of each of the aforementioned modules of the item listing categorization system 200 will now be described in greater detail in conjunction with FIG. 3.

Figure 3:
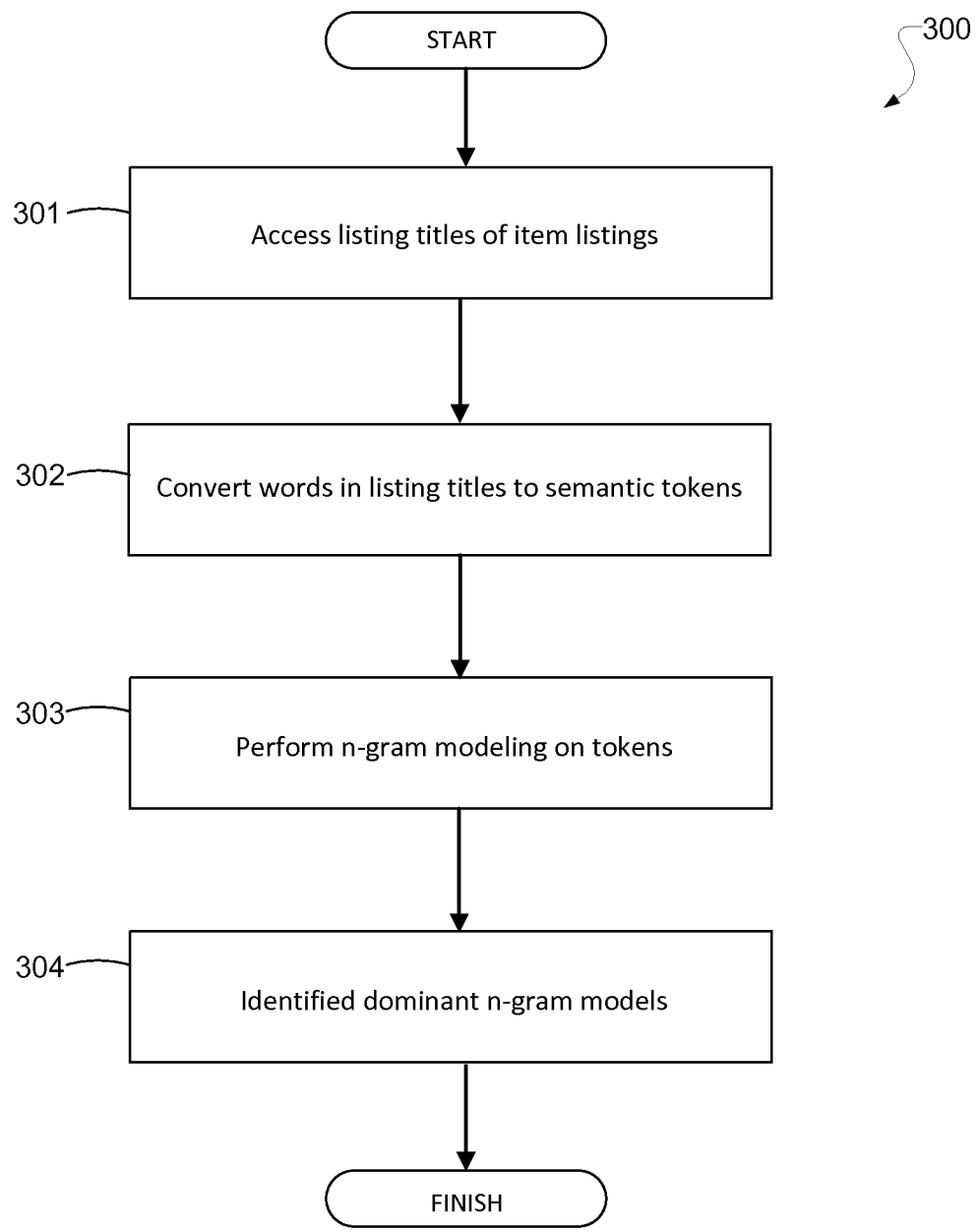
FIG. 3 is a flowchart illustrating an example method, according to various embodiments.

FIG. 3 is a flowchart illustrating an example method 300, according to various exemplary embodiments. The method 300 may be performed at least in part by, for example, the item listing categorization system 200 illustrated in FIG. 2 (or an apparatus having similar modules, such as client machines 110 and 112 or application server 118 illustrated in FIG. 1). In operation 301, the identification module 202 accesses listing titles of item listings posted on a marketplace website, where the item listings are associated with a particular product category in a product category structure of the marketplace website. For example, most marketplace websites (e.g., eBay®, Amazon®, etc.) offer a wide variety of products for sale, where such marketplace websites include item listing webpages (also referred to as item listings herein) that advertise a particular item or product for sale. Moreover, such marketplace websites typically maintain a product category structure defining various product categories (e.g., computers, toys, clothes, accessories, etc.), where each of the items or products offered for sale in each of the item listings are associated with a particular product category in the product category structure. In some embodiments, the item listing title and product category of an item listing may be submitted by a seller in conjunction with a request to post an item listing or an item listing page on the marketplace website. For example, the seller may access a user interface for allowing the seller to generate an item listing page, where the seller may specify an item listing title describing the item being sold, the product category of the item, as well as other information about the item (e.g., descriptions, pictures, characteristics, properties, prices, etc.). Accordingly, each item listing is associated with a particular product category in the product category structure of the marketplace website.

In some embodiments, the identification module 202 may access item listing information maintained by a marketplace website to identify the various existing item listings in a particular product category. For example, FIG. 4 illustrates an example of item listing information 400 that identifies various product categories (e.g., accessories, computers, etc.) in the product category structure of a marketplace website, as well as a list of existing item listings assigned to each of the product categories. For example, as illustrated in FIG. 4, the item listings 1-7 are associated with the "accessories" product category, while the item listings 11-16 are associated with the "computers" product category, and so on. The item listing information 400 may be stored locally at, for example, the database 206 illustrated in FIG. 2, or may be stored remotely at a database, data repository, storage server, etc., that is accessible by the item listing categorization system 200 via a network (e.g., the Internet).

In some embodiments, the item listing information 400 may identify all the item listings that are associated with the particular product category. However, it is possible that some item listings have been miscategorized in a particular product category, such as when a seller who has uploaded an item listing has specified the incorrect product category for the product in the item listing. Accordingly, in some embodiments, it is possible that the item listings in the item listing information 400 may only represent those item listings that are correctly associated with the corresponding product category. For example, the item listing categorization system 200 may display the item listings for review by a user (e.g., customer service personnel or administrator of a marketplace website) to confirm that the item listings do actually correspond to the appropriate product category. Accordingly, it is understood that, in some embodiments, the operation 301 in FIG. 3 may comprise accessing the listing titles of item listings that are known to be correctly assigned to a particular product category.

After identifying the item listings in a particular product category, the identification module 202 may access information (e.g., in a database associated with a marketplace website) describing the item listing titles for each of the item listings. For example, FIG. 5 illustrates an example flow 500 where an exemplary input string "leather case for Samsong galaxy" (see 501) corresponding to an item listing title is accessed by the determination module 202.

Referring back to the method 300 and FIG. 3, in operation 302, the tokenization module 204 converts words in each of the listing titles (accessed in operation 301) to semantic tokens in a token symbol space, based on a tokenization process. In some embodiments, the tokenizing process may involve identifying different words in the string, and may also involve normalizing each of the words and/or replacing each of the words with a substitute value or "token" representing each word. Examples of possible tokens in a token symbol space utilized by the item listing categorization system 200 may include a product token "P", an accessory token "A", an attribute token, a for token "4" (corresponding to the word "for"), a with token "w" (corresponding to the word "with"), an and token "&" (corresponding to the word "and"), an unknown token "?" representing an unknown word that cannot be classified as another type of token, and so on.

Figure 5:
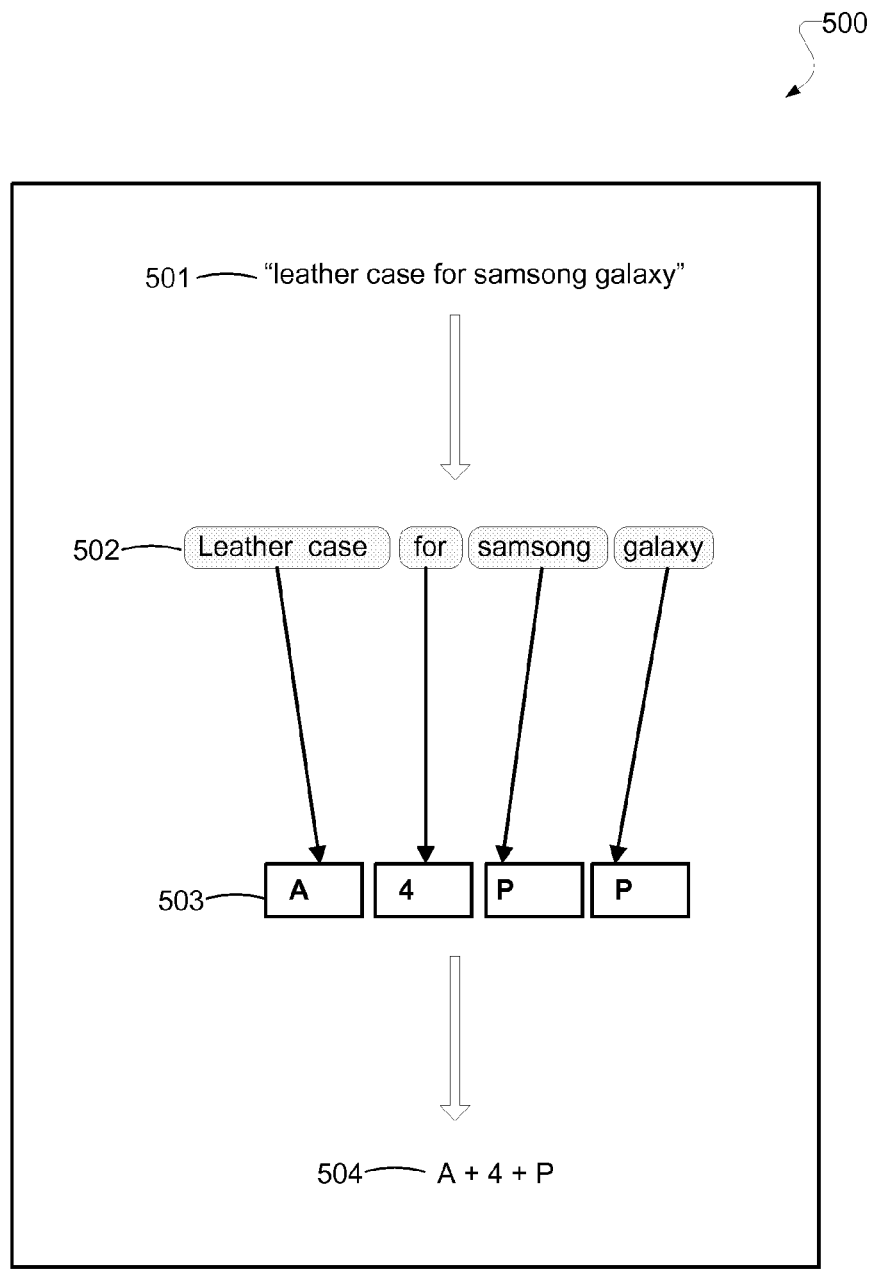
FIG. 5 illustrates exemplary aspects of techniques for tokenizing an item listing title, according to various embodiments.

For example, as illustrated in FIG. 5, the input string "leather case for Samsong galaxy" has been parsed into the words "leather case", "for", "Samsong", and "galaxy" (see 502), and these words have been tokenized to produce various tokens (see 503). For example, as illustrated in FIG. 5, the words "leather case" have been replaced with an accessory token "A", while the word "for" has been replaced with a "4" token, while the word "Samsong" has been replaced with a product token "P", while the word "galaxy" has also been replaced the product token "P".

In some embodiments, the tokenization process may involve referring to a list of predefined tokens. For example, the tokenization module 204 may compare each of the parsed words in the item listing title with lists of words associated with predefined token types. For example, the process of replacing the parsed words in the listing title with tokens may involve comparing the parsed words in the listing title with dictionaries or lists of predefined words associated with predefined tokens.

For example, the tokenization module 204 may access rules listing words corresponding to brand names (e.g., "Samsong") and product names (e.g., "galaxy") in the product inventory of a marketplace website, and if the tokenization module 204 detects any of these words in the listing title, it may replace these words with a product token "P". Similarly, the tokenization module 204 may access rules listing words corresponding to known accessories (e.g., "accessory", "case", "leather case", "charger", etc.) that may be available for sale on a marketplace website, and if the tokenization module 204 detects any of these words in the listing title, it may replace these words with an accessory token "A". Similarly, the tokenization module 204 may access a rule indicating that the words "for", "with", and "and" should be replaced with a for token "4", a with token "W", and an "&" token, respectively, and so on. The aforementioned tokens are merely exemplary, and it is understood that the aspects of this disclosure applicable to other types of words and other types of tokens that may be applicable to item listing titles. The aforementioned rules may be stored locally at, for example, the database 206 illustrated in FIG. 2, or may be stored remotely at a database, data repository, storage server, etc., that is accessible by the item listing categorization system 200 via a network (e.g., the Internet).

In some embodiments, the tokenization module 204 may determine that one or more of the words in the item listing title are attribute values associated with predefined attributes of one or more product categories in a product category structure of the e-commerce website, and the operation 302 in FIG. 3 may involve the tokenization module 204 tokenizing words in the input string with one or more attribute tokens. For example, the category structure of an e-commerce website (e.g., eBay.com) will typically specify various product categories in the product inventory of the e-commerce website, as well as various possible attributes and attribute values for each of the categories. For example, FIG. 6 illustrates an example of product category information 600 associated with product category structure of an e-commerce website. The product information 600 identifies various product categories (e.g., accessories, computers, etc.) and, for each of the product categories, a number of attributes, such as the attributes "brand", "model" and "size" associated with the product category of "accessories". Although not shown in FIG. 6, the product category information 600 may also include dictionaries of qualifying attribute-value pairs corresponding to various product attributes (e.g., size, type, brand, color, etc.). For example, the product category information 600 may indicate that, for the attribute of brand, the various possible values that this attribute may take are "Gucci", "Chanel", etc., while for the attribute of size, the various possible values that this attribute may take include "small", "medium", "large", etc., while for the attribute of color, the various possible values that this attribute may take include "red", "blue", "green", etc., and so on for each of the attributes for each product category.

Accordingly, the tokenization module 204 may perform an attribute extraction process on the input string to determine if any of the words therein correspond to attribute values in attribute-value pairs. For example, for the input string "large red case for iPhone", the tokenization module 204 may determine that the tokens of "large" and "red" correspond to attribute values for the attributes "size" and "color" in one or more produce categories (e.g., the product category of "accessories" as illustrated in FIG. 6). In other words, the tokenization module 204 may determine that the word "large" may correspond to the known attribute-value pair of "size: large", while the word "red" may correspond to the known attribute-value pair of "color:red". Accordingly, the operation 302 in FIG. 3 may involve the tokenization module 204 replacing the words "large" and "red" in the input string "large red case for iPhone" with one or more attribute tokens. Alternatively, upon determining that the words "large" and "red" correspond to attribute values, the tokenization module 204 may combine these words into an adjacent token (e.g., the tokenization module 204 may combine the words "large red case" into the accessory token "A" associated with the word "case").

Various techniques for tokenizing words in a string are well understood by those skilled in the arts of linguistics, lexical analysis, and natural language processing, and will not be described in further detail herein in order to avoid occluding various aspects of this disclosure.

Referring back to the method 300 and FIG. 3, in operation 303, the tokenization module 204 performs n-gram modeling on each of the tokenized listing titles of the item listings in a particular product category. As understood by those skilled in the art, the process of n-gram modelling involves analyzing strings or sequences of one or more words or tokens, in order to detect trends in such strings or sequences of words or tokens. For example, the tokenization module 204 may utilize the process of n-gram modeling to analyze all the tokenized listing titles in a particular category, in order to determine trends (e.g., in the occurrence and ordering of various tokens) in each of the listing titles in that particular category.

For example, as illustrated in FIG. 5, the tokenization module 204 may determine that the sequence of tokens for the input string "leather case for Samsong galaxy" (which is associated with an accessory product category) corresponds to the n-gram model of one or more accessory tokens "A" followed by a for token "4" followed by one or more product tokens "P", otherwise referred to as an A+4+P n-gram model (see 504). Accordingly, in some examples, by performing n-gram modeling and machine leaning on a large number of listing titles associated with the accessory product category, the system may determine that, for example, the A+4+P n-gram model is a dominant n-gram model for accessory item listings, in that it occurs in a large portion or a statistically significant portion of the item listings in the accessory product category. As another example, the system may determine that, for example, the P+A n-gram model (e.g., "iPhone case") is another dominant n-gram model for accessory product listings. These techniques can be applied by the item listing categorization system 200 to item listings associated with other product types or product categories, such as n-gram models for "bundles" (e.g., "Canon 600D with lens" corresponds to a P token+P token+"w" (with) token+A token).

Accordingly, by utilizing various techniques of n-gram modelling and machine learning, the tokenization module 204 may identify that a particular sequence of tokens occurs in a large portion or a statistically significant portion of the item listing titles in a particular category, where such a sequence of tokens may be referred to herein as a dominant n-gram model associated with the particular product category. Various techniques for performing n-gram modeling and machine learning on tokens are well understood by those skilled in the arts of linguistics, lexical analysis, and natural language processing, and will not be described in further detail herein in order to avoid occluding various aspects of this disclosure.

Accordingly, referring back to the method 300 in FIG. 3, in operation 304, the tokenization module 204 identifies one or more dominant n-gram models associated with the listing titles of the item listings in a particular product category. As described above, in some embodiments, each dominant n-gram model identifies a sequence of one or more semantic tokens that appear in a large portion or a statistically significant portion of the listing titles of the item listings in the particular product category.

In some embodiments, the tokenization module 204 may repeat the method 300 with a majority or all of the available item listings in each of the product categories in the product category structure of the marketplace website, in order to determine dominant n-gram models for each of the product categories. In some embodiments, after the tokenization module 204 identifies various dominant n-gram models associated with the particular product category, the tokenization module 204 may store this information in dominant n-gram model information 700 illustrated in FIG. 7, which identifies various dominant n-gram models corresponding to different product categories. The dominant n-gram model information 700 may be stored locally at, for example, the database 206 illustrated in FIG. 2, or may be stored remotely at a database, data repository, storage server, etc., that is accessible by the item listing categorization system 200 via a network (e.g., the Internet).

In some embodiments, after the system 200 uses n-gram modelling and machine learning to learn the dominant n-gram models for various product categories, the system 200 may automatically categorize item listings by parsing the listing titles and determining if the listing titles are associated with the dominant n-gram model for a particular product category. For example, when a seller attempts to upload a new item listing to a marketplace website, the seller may specify an item listing title for the item listing, such as "carry bag for laptop". The tokenization module 204 may tokenize the item listing title using the techniques described herein, and compare the resulting tokenized item listing title to the dominant n-gram models associated with various product categories (e.g., based on the dominant n-gram model information 700 illustrated in FIG. 7). If the tokenization module 204 detects a match between the tokenized item listing title provided by the seller (e.g., "carry bag for laptop") and one of the dominant n-gram models (e.g., A+4+P) associated with a given product category (e.g., accessories), the tokenization module 204 may determine that the item in the item listing title belongs to that given product category. The tokenization module 204 may transmit a notification to the seller identifying the correct product category, or the tokenization module 204 may automatically enter the correct product category (or pre-fill product category specification fields) in a user interface used by sellers to upload item listings. In some embodiments, if the seller has already specified a category for the item listing, the tokenization module 204 may utilize the techniques described above to determine if the item listings associated with the seller-specified category; if not, the tokenization module 204 may associate the item listing with the correct product category, and/or notify the seller that the item listing is not associated with the correct product category, and so on.

In some embodiments, the item listing categorization system 200 can assign new item listings to product categories even when unknown tokens are present. For example, if the system receives the item listing title "Gobbledygook for HTC zero" with token symbolization ?+4+P (where "?" represents an unknown token), then the tokenization module 204 may then compare this tokenized item listing title with the various dominant n-gram models for each of the product categories (see FIG. 7). Even though there may not be an exact match with any particular dominant n-gram model, the tokenization module 204 may determine that, for example, the closest match is the dominant n-gram model A+4+P of the accessories product category. Accordingly, the tokenization module 204 may determine that tokenized item listing title likely corresponds to the A+4+P dominant n-gram model associated with accessory listings, and that the item listing should be associated with the accessory product category.

Figure 8:
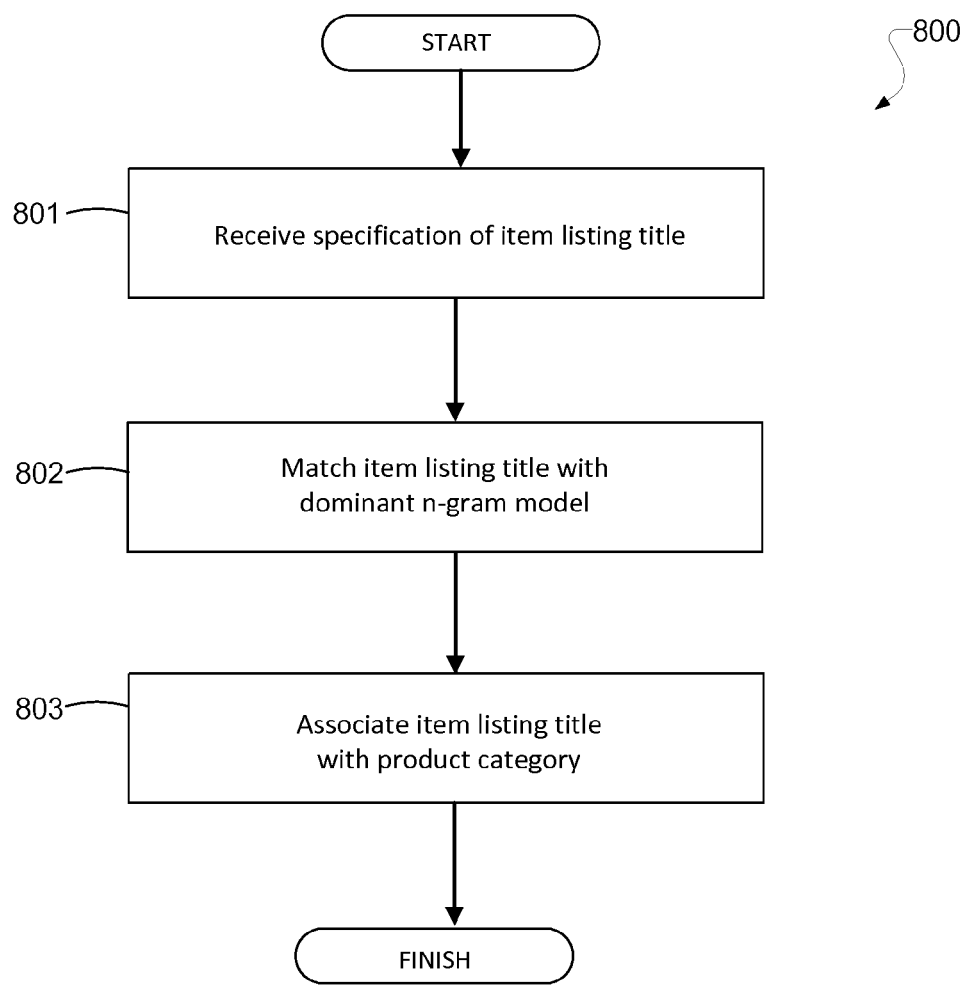
FIG. 8 is a flowchart illustrating an example method, according to various embodiments.

FIG. 8 is a flowchart illustrating an example method 800, consistent with various embodiments described above. The method 800 may be performed at least in part by, for example, the item listing categorization system 200 illustrated in FIG. 2 (or an apparatus having similar modules, such as client machines 110 and 112 or application server 118 illustrated in FIG. 1). The method 800 may be performed after, for example, the method 300 and FIG. 3. In operation 801, the tokenization module 204 receives a user specification of an item listing title in connection with a user request to post an item listing on a marketplace website. In operation 802, the tokenization module 204 matches the item listing title with a dominant n-gram model associated with a particular product category in a product category structure of the marketplace website. In operation 803, the tokenization module 204 associates the item listing title with the particular product category identified in operation 802. The tokenization module 204 may notify a seller associated with the item listing that the item listing is going to be assigned to the particular product category in the product category structure of the marketplace website.

Example Mobile Device

Figure 9:
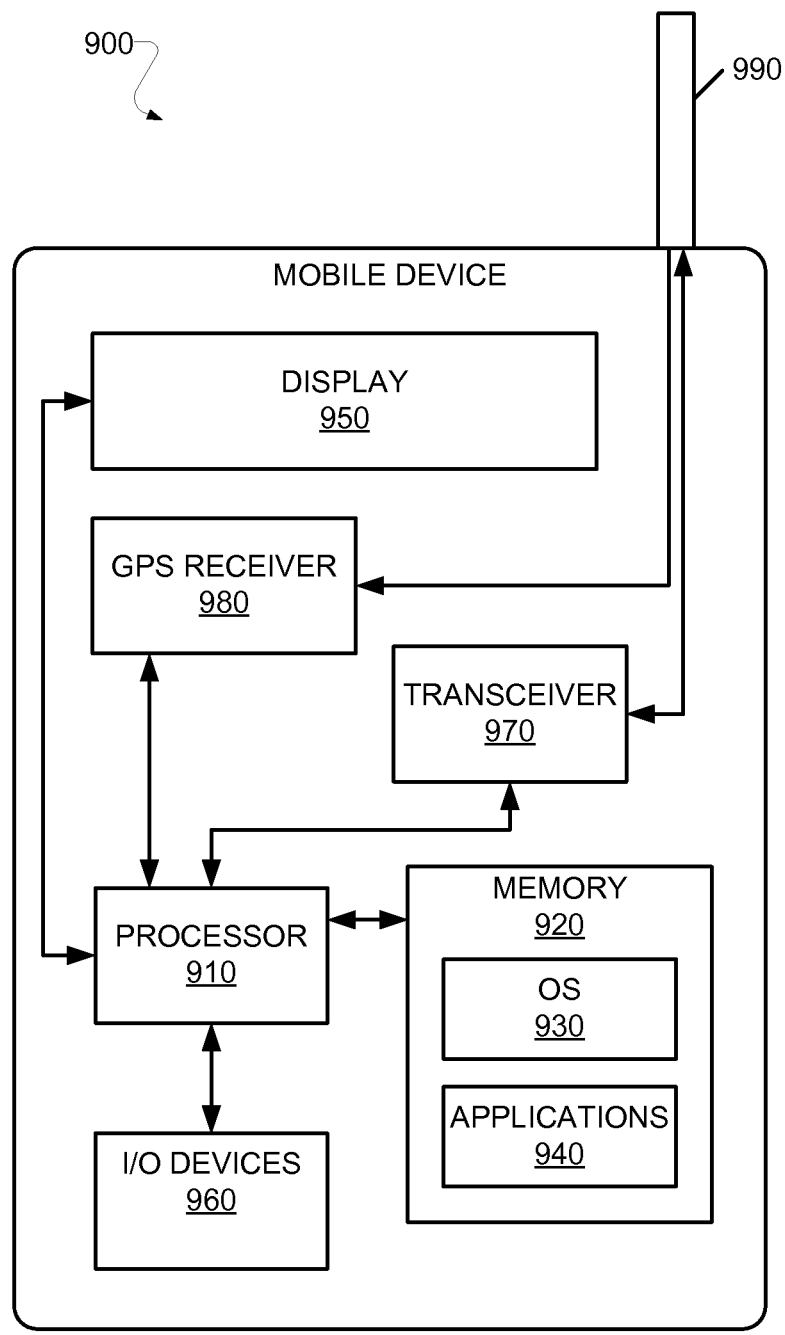
FIG. 9 illustrates an exemplary mobile device, according to various embodiments.

FIG. 9 is a block diagram illustrating the mobile device 900, according to an example embodiment. The mobile device may correspond to, for example, client machines 110 and 112 or application server 118 illustrated in FIG. 1. One or more of the modules of the system 200 illustrated in FIG. 2 may be implemented on or executed by the mobile device 900. The mobile device 900 may include a processor 910. The processor 910 may be any of a variety of different types of commercially available processors suitable for mobile devices (for example, an XScale architecture microprocessor, a Microprocessor without Interlocked Pipeline Stages (MIPS) architecture processor, or another type of processor). A memory 920, such as a Random Access Memory (RAM), a Flash memory, or other type of memory, is typically accessible to the processor 910. The memory 920 may be adapted to store an operating system (OS) 930, as well as application programs 940, such as a mobile location enabled application that may provide location based services to a user. The processor 910 may be coupled, either directly or via appropriate intermediary hardware, to a display 950 and to one or more input/output (I/O) devices 960, such as a keypad, a touch panel sensor, a microphone, and the like. Similarly, in some embodiments, the processor 910 may be coupled to a transceiver 970 that interfaces with an antenna 990. The transceiver 970 may be configured to both transmit and receive cellular network signals, wireless data signals, or other types of signals via the antenna 990, depending on the nature of the mobile device 900. Further, in some configurations, a GPS receiver 980 may also make use of the antenna 990 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 10:
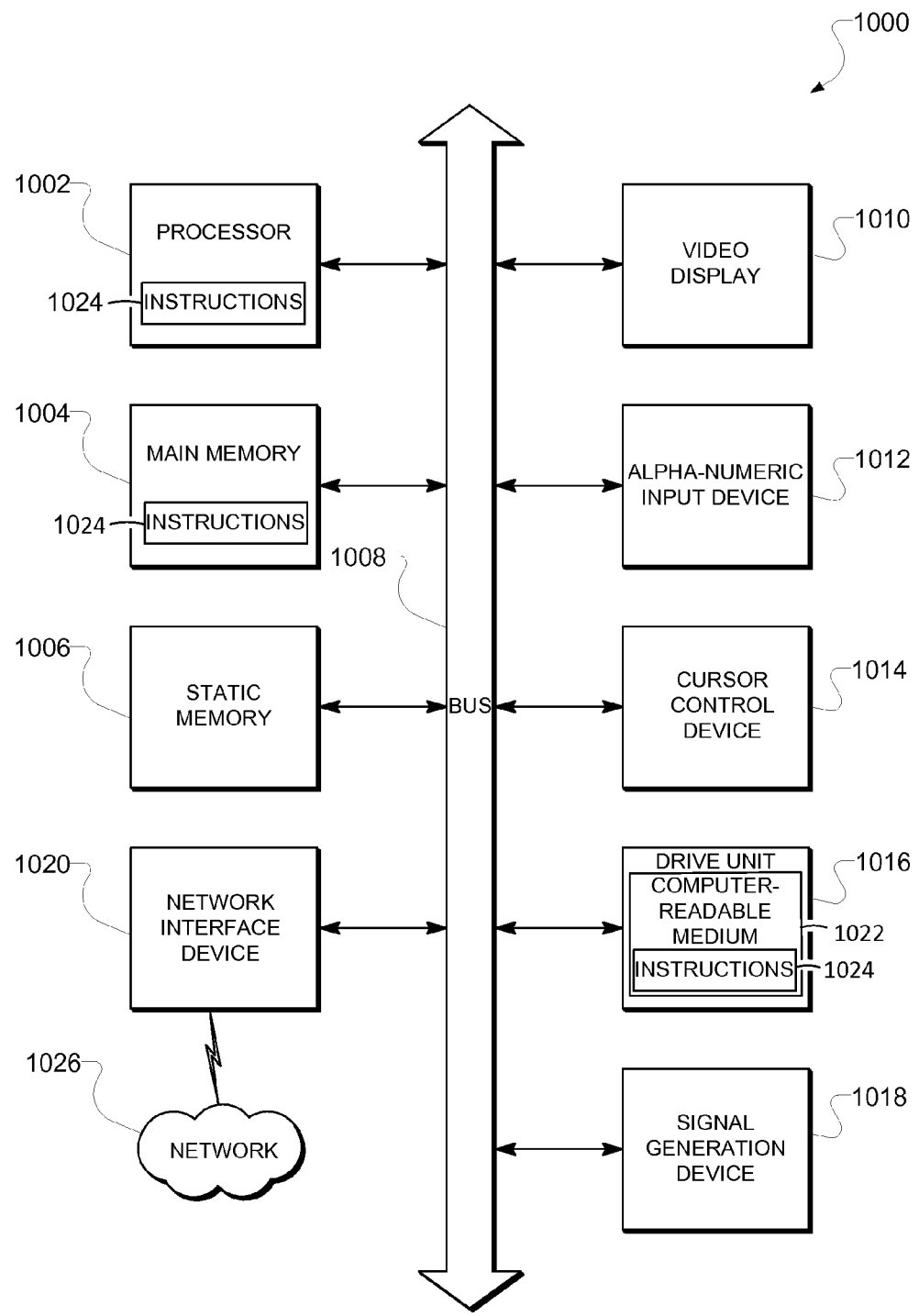
FIG. 10 is a diagrammatic representation of a machine in the example form of a computer system within which a set of instructions, for causing the machine to perform any one or more of the methodologies discussed herein, may be executed.

FIG. 10 is a block diagram of machine in the example form of a computer system 1000 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard or a touch-sensitive display screen), a user interface (UI) navigation device 1014 (e.g., a mouse), a disk drive unit 1016, a signal generation device 1018 (e.g., a speaker) and a network interface device 1020.

Machine-Readable Medium

The disk drive unit 1016 includes a machine-readable medium 1022 on which is stored one or more sets of instructions and data structures (e.g., software) 1024 embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi, LTE, and WiMax WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
   accessing listing titles of one or more item listings on a marketplace website, the item listings being associated with a particular product category in a product category structure of the marketplace website;
   converting words in each of the listing titles to semantic tokens in a token symbol space, based on a tokenization process;
   performing n-gram modeling on the tokens corresponding to each of the listing titles of the item listings in the particular product category; and
   identifying, by a machine having a memory and at least one processor, one or more dominant n-gram models associated with the listing titles of the item listings in the particular product category, each dominant n-gram model identifying a sequence of one or more semantic tokens that appear in a statistically significant portion of the listing titles of the item listings in the particular product category.

2. The method of claim 1, wherein the tokens include a product token, an accessory token, a for token, a with token, and an unknown token.

3. The method of claim 1, further comprising:
   receiving a user specification of an item listing title in connection with a user request to post an item listing on the marketplace website;
   matching the item listing title with the dominant n-gram model associated with the particular product category; and
   associating the item listing title with the particular product category.

4. The method of claim 3, wherein the item listing title further includes a seller specification of a second product category distinct from the particular product category, and
   wherein the method further comprises notifying the seller that the item listing title is associated with the particular product category and is not associated with the second product category.

5. The method of claim 1, wherein the particular product category is an accessory items product category.

6. The method of claim 5, wherein one of the dominant n-gram models for the accessory items product category includes a product token followed by a for token followed by an accessory token.

7. The method of claim 5, wherein one of the dominant n-gram models for the accessory items product category includes a product token followed by an accessory token.

8. The method of claim 1, wherein the product category is a bundled items product category.

9. The method of claim 8, wherein one of the dominant n-gram models for the bundled items product category includes a product token followed by a with token followed by an accessory token.

10. A system comprising:
    a machine having a memory and at least one processor;
    a listing module configured to access listing titles of one or more item listings on a marketplace website, the item listings being associated with a particular product category in a product category structure of the marketplace website; and
    a tokenization module, executable by the machine, configured to:
       convert words in each of the listing titles to semantic tokens in a token symbol space, based on a tokenization process;
       perform n-gram modeling on the tokens corresponding to each of the listing titles of the item listings in the particular product category; and
       identify one or more dominant n-gram models associated with the listing titles of the item listings in the particular product category, each dominant n-gram model identifying a sequence of one or more semantic tokens that appear in a statistically significant portion of the listing titles of the item listings in the particular product category.

11. The system of claim 10, wherein the tokens include a product token, an accessory token, a for token, a with token, and an unknown token.

12. The system of claim 10, wherein the tokenization module is further configured to:
    receive a user specification of an item listing title in connection with a user request to post an item listing on the marketplace website;
    match the item listing title with the dominant n-gram model associated with the particular product category; and
    associate the item listing title with the particular product category.

13. The system of claim 10, wherein the particular product category is an accessory items product category.

14. The system of claim 13, wherein one of the dominant n-gram models for the accessory items product category includes a product token followed by a for token followed by an accessory token.

15. The system of claim 13, wherein one of the dominant n-gram models for the accessory items product category includes a product token followed by an accessory token.

16. The system of claim 10, wherein the product category is a bundled items product category.

17. The system of claim 16, wherein one of the dominant n-gram models for the bundled items product category includes a product token followed by a with token followed by an accessory token.

18. A non-transitory machine-readable storage medium having embodied thereon instructions executable by one or more machines to perform operations comprising:
   accessing listing titles of one or more item listings on a marketplace website, the item listings being associated with a particular product category in a product category structure of the marketplace website;
   converting words in each of the listing titles to semantic tokens in a token symbol space, based on a tokenization process;
   performing n-gram modeling on the tokens corresponding to each of the listing titles of the item listings in the particular product category; and
   identifying one or more dominant n-gram models associated with the listing titles of the item listings in the particular product category, each dominant n-gram model identifying a sequence of one or more semantic tokens that appear in a statistically significant portion of the listing titles of the item listings in the particular product category.

* * * * *